US008953998B2

(12) United States Patent
Wu

(10) Patent No.: US 8,953,998 B2
(45) Date of Patent: *Feb. 10, 2015

(54) METHOD OF HANDLING MULTIMEDIA BROADCAST AND MULTICAST SERVICE TRANSMISSION AND RECEPTION AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 989 days.

This patent is subject to a terminal disclaimer.

(21) Appl. No.: 12/874,226

(22) Filed: Sep. 2, 2010

(65) Prior Publication Data

US 2011/0053490 A1    Mar. 3, 2011

Related U.S. Application Data

(60) Provisional application No. 61/239,067, filed on Sep. 2, 2009.

(51) Int. Cl.
*H04H 20/71*    (2008.01)
*H04W 72/00*    (2009.01)

(52) U.S. Cl.
CPC ................................. *H04W 72/005* (2013.01)
USPC ..................................................... 455/3.01

(58) Field of Classification Search
CPC ............................ H04W 72/005; H04B 1/7103
USPC ..................................................... 455/3.01
See application file for complete search history.

(56) References Cited

U.S. PATENT DOCUMENTS

| 8,300,566 | B2 | 10/2012 | Kuo |
| 2008/0207151 | A1* | 8/2008 | Rinne et al. ................... 455/140 |
| 2011/0013554 | A1* | 1/2011 | Koskinen ...................... 370/315 |

FOREIGN PATENT DOCUMENTS

| CN | 101291466 A | 10/2008 |
| EP | 1983702 A2 | 10/2008 |
| EP | 2 234 420 A1 | 9/2010 |
| JP | 2009525673 A | 7/2009 |
| JP | 2010529731 A | 8/2010 |
| KR | 1020080075811 A | 8/2008 |
| KR | 1020090081014 A | 7/2009 |
| WO | 2007091823 | 8/2007 |
| WO | 2007091823 A1 | 8/2007 |
| WO | 2008023928 A2 | 2/2008 |

(Continued)

OTHER PUBLICATIONS

3GPP TR 36.814 V0.4.1 Technical Specification Group Radio Access Network; Further Advancements for E-UTRA Physical Layer Aspects (Release 9), Feb. 2009.

(Continued)

*Primary Examiner* — Ankur Jain
(74) *Attorney, Agent, or Firm* — Winston Hsu; Scott Margo

(57) ABSTRACT

A method of handling multimedia broadcast and multicast service (MBMS) transmission and reception for a mobile device in a wireless communication system is disclosed. The method includes enabling a plurality of component carriers, and applying a multi-media broadcast over a single frequency network (MBSFN) allocation on a first enabled component carrier and not on the rest of the enabled component carriers when the mobile device receives the MBSFN allocation on the first enabled component carrier.

8 Claims, 10 Drawing Sheets

(56) References Cited

FOREIGN PATENT DOCUMENTS

| WO | 2008153302 | | 12/2008 |
|---|---|---|---|
| WO | 2008153302 | A2 | 12/2008 |
| WO | 2009049167 | A2 | 4/2009 |
| WO | 2009053879 | A1 | 4/2009 |
| WO | 2009078152 | A1 | 6/2009 |

OTHER PUBLICATIONS

Nokia, 3GPP TSG RAN WG1 Meeting #57bis R1-092575 "Summary of email discussion on carrier aggregation terminology", Jun. 2009.
3GPP TS 36.300 V9.0.0 Evolved Universal Terrestrial Radio Access (E-UTRA) and Evolved Universal Terrestrial Radio Access Network (E-UTRAN); Overall description, Jun. 2009.
3GPP TS 36.331 V8.6.0 Evolved Universal Terrestrial Radio Access (E-UTRA) Radio Resource Control (RRC), Jun. 2009.
Office action mailed on Nov. 5, 2012 for the China application No. 201010276615.9, filing date Sep. 2, 2010, p. 1-10.
Notice of Allowance mailed on Jan. 15, 2013 for the Japanese application No. 2010-196865, filing date Sep. 2, 2010, pp. 1-3.
Office action mailed on May 18, 2012 for the European application No. 10009104.0, p. 1-6.
Office Action mailed on Apr. 27, 2012 for the Korean Application No. 1020100086221, filing date Sep. 2, 2010, p. 1-3.
Office action mailed on Jun. 19, 2012 for the Japanese application No. 2010-196865, filing date Sep. 2, 2010, pp. 1-3.
3GPP TS 36.300 V8.9.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", cover page + p. 82-83, Jun. 2009.
Office action mailed on Dec. 2, 2013 for the Taiwan application No. 099129675, filing date Sep. 2, 2010, p. 1-8.
ETSI MCC, Report of 3GPP TSG Ran WG2 meeting #66bis, Los Angeles, USA, Jun. 29-Jul. 3, 2009, TSG-RAN Working Group 2 meeting #67, R2-095359, Aug. 4-8, 2009, Shenzhen, China.
ETSI TS 136 300 V8.9.0, Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8), (Jul. 2009).

* cited by examiner

METHOD OF HANDLING MULTIMEDIA BROADCAST AND MULTICAST SERVICE TRANSMISSION AND RECEPTION AND RELATED COMMUNICATION DEVICE

CROSS REFERENCE TO RELATED APPLICATIONS

This application claims the benefit of U.S. Provisional Application No. 61/239,067, filed on Sep. 2, 2009 and entitled "Methods for handling MBMS transmission and reception in wireless communications system and related communication device" the contents of which are incorporated herein.

BACKGROUND OF THE INVENTION

1. Field of the Invention

The present invention relates to a method used in a wireless communications system and related communication device, and more particularly, to a method of handling multimedia broadcast multicast service transmission and reception in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control. A long term evolution-advanced (LTE-A) system, as its name implies, is an evolution of the LTE system, with carrier aggregation and relay deployment. The carrier aggregation, where two or more component carriers are aggregated, allows a UE of the LTE-A system to simultaneously transmit and receive data via multiple carriers, where the UE of the LTE system can only utilize one carrier for data transmission at any time.

The component carriers of the LTE-A system includes three types: backwards compatible carrier, non-backwards compatible carrier and extension carrier. The backwards compatible carrier is a carrier accessible to UEs of all LTE releases, e.g. the UE of release 8, 9, or 10 (Rel-8/9/10). The non-backwards compatible carrier is a carrier not accessible to UEs of earlier LTE releases, but accessible to UEs of the release defining such a carrier. The extension carrier is a carrier that is not operated stand-alone, but must be a part of a component carrier set where at least one of the carriers in the set is a stand-alone-capable carrier.

In the E-UTRAN, multimedia broadcast multicast service (MBMS) can be provided on a frequency layer dedicated to MBMS (a set of cells dedicated to MBMS transmission i.e. a set of "MBMS dedicated cells") and/or on a frequency layer shared with non-MBMS services (a set of cells supporting both unicast and MBMS transmissions i.e. a set of "Unicast/MBMS mixed cells"). In both cases, a single frequency network mode of operation is possible for MBMS transmission, known as MBSFN. The MBMS reception is possible for the UE in RRC_CONNECTED or RRC_IDLE states.

An MBSFN synchronization area is an area of the network where all eNBs can be synchronized and perform MBSFN transmissions. The MBSFN synchronization area is capable of supporting one or more MBSFN Areas. On a given frequency layer, an eNB can only belong to one MBSFN synchronization area.

An MBSFN area consists of a group of cells within an MBSFN Synchronization Area of a network, which are coordinated to achieve an MBSFN Transmission. Except for the MBSFN Area Reserved Cells, all cells within an MBSFN Area contribute to the MBSFN Transmission and advertise its availability. A cell within an MBSFN Synchronization Area belongs to only one MBSFN Area for all MBMS services.

Subframe allocation reserved for MBSFN transmission can be transferred by a system information block 2 (SIB2), including parameters of the number of subframe for the MBSFN transmission and related radio frame period and offset.

The eNB can allocate MBSFN subframes and signals the MBSFN allocation to the UE in the abovementioned manner only concerning one single component carrier case (e.g. in the LTE system or only one component carrier enabled in a LTE-A UE). However, the LTE-A UE can simultaneously have multiple component carriers enabled and the component carriers may be enabled as different types of component carriers (e.g. backwards, non-backwards or extension types). Thus, the following scenario may occur. A UE having enabled carrier aggregation considers a MBSFN allocation applied to an extension carrier, but the network does not. In this situation, the UE does not receive downlink data (unicast data) in subframes whose subframe times correspond to the MBSFN subframes times in the extension carrier. However, the network does transmit the downlink data in the subframes, and therefore data loss occurs.

In addition, when the UE capable of transmitting and receiving data on m component carriers receives MBMS services on a MBMS dedicated component carrier, how the UE performs data access and deals with the on-going MBMS service reception is not concerned. Furthermore, the network may simultaneously serve UEs of different LTE system versions, e.g. a release 8, 9 or 10 UE (Rel-8/9/10 UE) and therefore UE management for the UEs should be concerned when deploying resources (e.g. cell/component carrier/frequency layer) for the MBMS service. Or the Rel-8 or Rel-9 UE may camp on a cell of an MBMS dedicated frequency due to cell selection or reselection. However, the cell of MBMS dedicated frequency does not support unicast data transmission/reception such that the UE cannot transmit or receive unicast data, e.g. data related to a Voice over Internet Protocol (VoIP) call.

SUMMARY OF THE INVENTION

The disclosure therefore provides a method and related communication device for handling multimedia broadcast and multicast service (MBMS) transmission and reception, to avoid the abovementioned data loss and resource allocation defect.

A method of handling MBMS transmission and reception for a mobile device in a wireless communication system is disclosed. The method includes enabling a plurality of component carriers, and applying a multi-media broadcast over a single frequency network (MBSFN) allocation on a first enabled component carrier and not on the rest of the enabled component carriers when the mobile device receives the MBSFN allocation on the first enabled component carrier.

A method of handling MBMS transmission and reception for a mobile device in a wireless communication system is disclosed. The method includes performing data exchange on a first component carrier when the mobile device receives MBMS data on a MBMS-dedicated component carrier, wherein the first component carrier supports data exchange of non-MBMS data.

A method of handling MBMS transmission and reception for a mobile device in a wireless communication system is disclosed. The method includes enabling at least two component carriers for data reception when the mobile device is in a radio resource control idle mode.

A method of handling MBMS transmission and reception for a network capable of simultaneously communicating with a mobile device via a plurality of component carriers in a wireless communication system is disclosed. The method includes transmitting configuration information associated with a component carrier of a first type on a component carrier of a second type, wherein the component carrier of the first type and the component carrier of the second type correspond to the mobile device.

A method of handling MBMS transmission and reception for a network capable of communicating with a first mobile device of a first system version of a wireless communication system and a second mobile device of a second system version of the wireless communication system is disclosed. The method includes using a component carrier as a MBMS dedicated component carrier, wherein the first mobile device of the first system version supports the component carrier and the second mobile device of the second system version does not support the component carrier.

A communication device of a wireless communication system for handling MBMS transmission and reception is disclosed. The communication device includes means for enabling a plurality of component carriers, and means for applying a MBSFN allocation on a first enabled component carrier and not on the rest of the enabled component carriers, when the communication device receives the MBSFN allocation on the first enabled component carrier.

A communication device of a wireless communication system for handling MBMS transmission and reception is disclosed. The communication device includes means for enabling a first component carrier and a MBMS-dedicated component carrier, and means for performing data exchange on the first component carrier when the communication device receives MBMS data on the MBMS-dedicated component carrier, wherein the first component carrier supports data exchange of non-MBMS data.

A communication device of a wireless communication system for handling MBMS transmission and reception is disclosed. The communication device includes means for entering a radio resource control idle mode, and means for enabling at least two component carriers for data reception when the communication device is in the radio resource control idle mode.

A communication device of a wireless communication system for handling MBMS transmission and reception is disclosed. The communication device includes means for configuring a component carrier of a first type and a component carrier of a second type to a mobile device, and means for transmitting configuration information associated with the component carrier of the first type on the component carrier of the second type.

A communication device of a wireless communication system for handling MBMS transmission and reception is disclosed. The communication device includes means for communicating with a first mobile device of a first system version of a wireless communication system and a second mobile device of a second system version of the wireless communication system, and means for using a component carrier as a MBMS dedicated component carrier, wherein the first mobile device of the first system version supports the component carrier and the second mobile device of the second system version does not support the component carrier.

These and other objectives of the present disclosure will no doubt become obvious to those of ordinary skill in the art after reading the following detailed description of the preferred example that is illustrated in the various figures and drawings.

DETAILED DESCRIPTION

Figure 1:
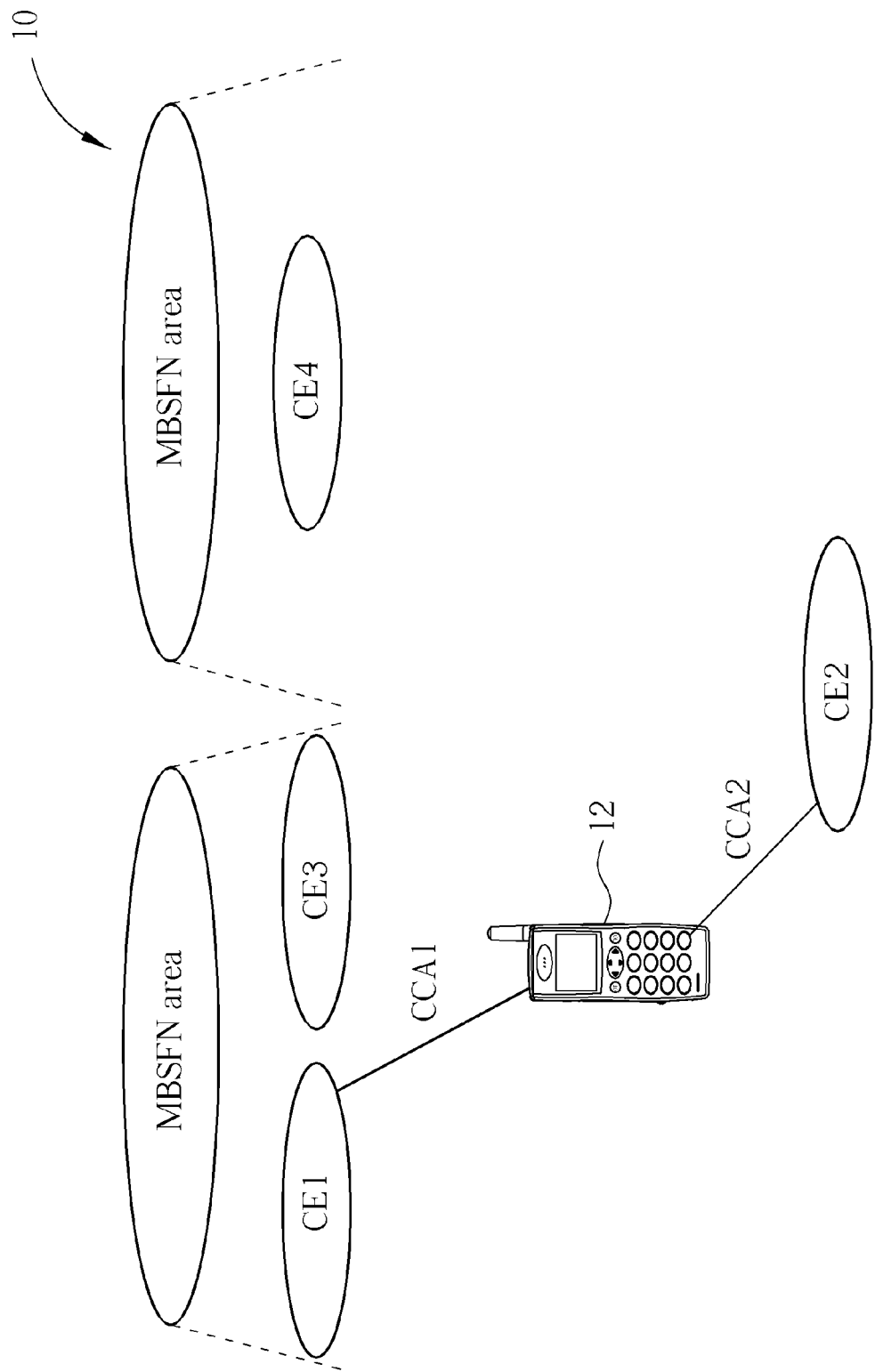
FIG. 1 is a schematic diagram of an examplary wireless communications system.

Please refer to FIG. 1, which is a schematic diagram of an examplary wireless communications system 10 (e.g. long term evolution-advanced (LTE-A) system) supporting simultaneous transmission/reception on multiple carriers (e.g. carrier aggregation) for each mobile device. For convenience of explaining the concept of the disclosure, the wireless communications system 10 is illustrated to simpily include a mobile device 12 and cells CE1-CE4. For carrier aggregation, the mobile device 12 enables component carriers CCA1, CCA2 corresponding to CE1, CE2, respectively. The mobile device 12 is referred as to a user equipments (UE) that can be devices such as mobile phones, portable computer systems, etc. The cells CE1, CE3 are multimedia broadcast and multicast service (MBMS) dedicated cells, belonging to multimedia broadcast over a single frequency network (MBSFN) area, and thereby the cells CE1, CE3 may be timely synchronized to provide MBMS service. The cell CE4 is an MBMS dedicated cell belonging to another MBSFN area. Accordingly, the component carriers CCA1 can be regard as an MBMS dedicated component carrier, whereas the component carriers CCA2 can be regarded as a non-MBMS dedicated component carrier. The MBMS dedicated cell/component carrier represents a cell/component carrier dedicated for MBMS service only, whereas the non-MBMS dedicated component carrier represents a component carrier for transfer of non-MBMS data, e.g. unicast data or both MBMS data and non-MBMS data. The mobile device 12 may perform cell search for a cell selection/reselection and may find the cell CE3 and/or CE4. The network (e.g. CE1-CE4) and the mobile device 12 may be seen as a transmitter or receiver according to transmission direction, e.g., for uplink (UL), the mobile device 12 is the transmitter and the network is the receiver, and for downlink (DL), the network is the transmitter and the mobile device 12 is the receiver.

Figure 2:
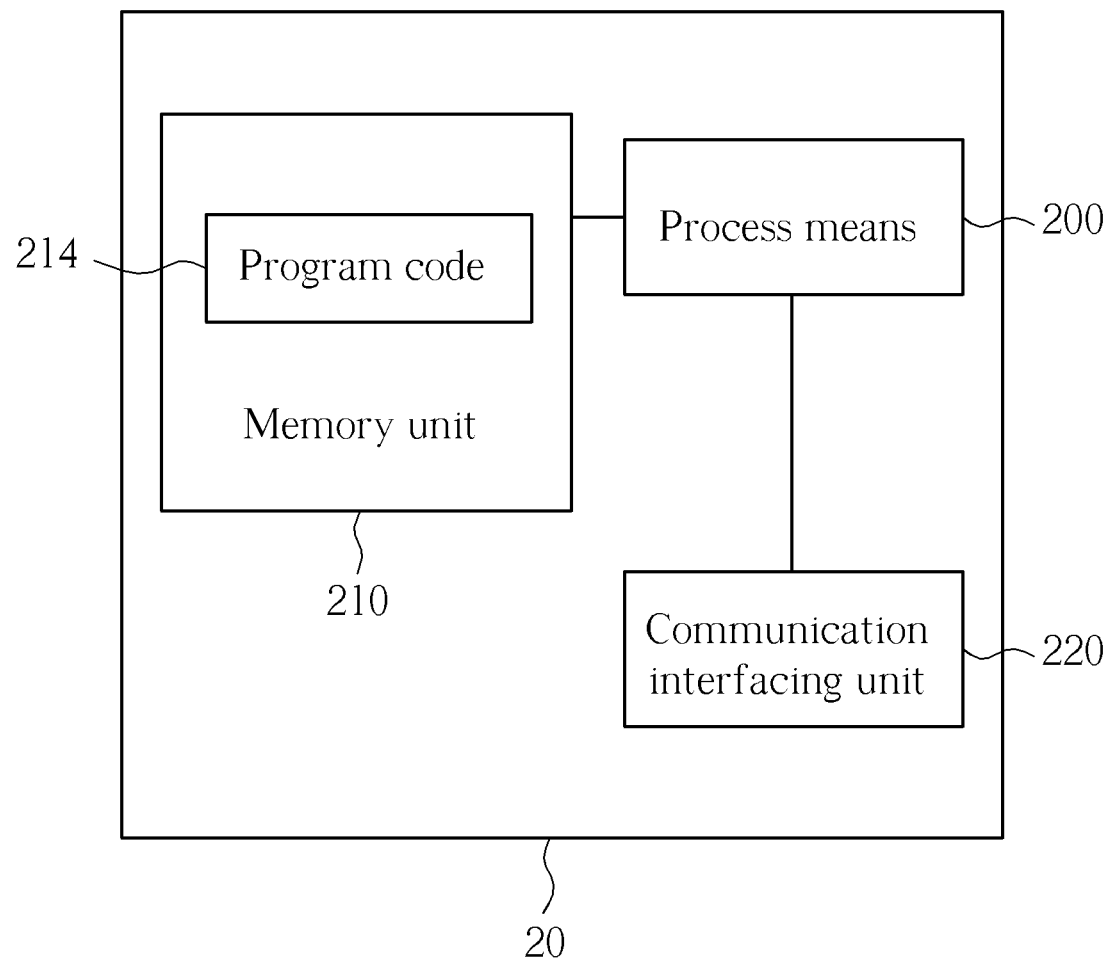
FIG. 2 is a schematic diagram of an examplary communication device.

Please refer to FIG. 2, which illustrates a schematic diagram of an examplary communication device 20. The communication device 20 may be the mobile device 12 of FIG. 1 or a network device controlling the cells CE1-CE4 and include a process means 200 such as a microprocessor or ASIC (Application-Specific Integrated Circuit), a memory unit 210 and a communication interfacing unit 220. The memory unit 210 may be any data storage device that can store program code 214 for access by the process means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals with other communication devices according to processing results of the process means 200. The program code 214 may include radio resource control and physical layer configuration for managing multiple component carriers, e.g. carrier aggregation enabling, component carrier activation/deactivation, maximum component carrier number management, etc. Thus, the process means 200 can control the communication interfacing unit 220 to receive signaling/data at certain frequency band(s) and time(s) according to the processing results of the program code 214.

Figure 3:
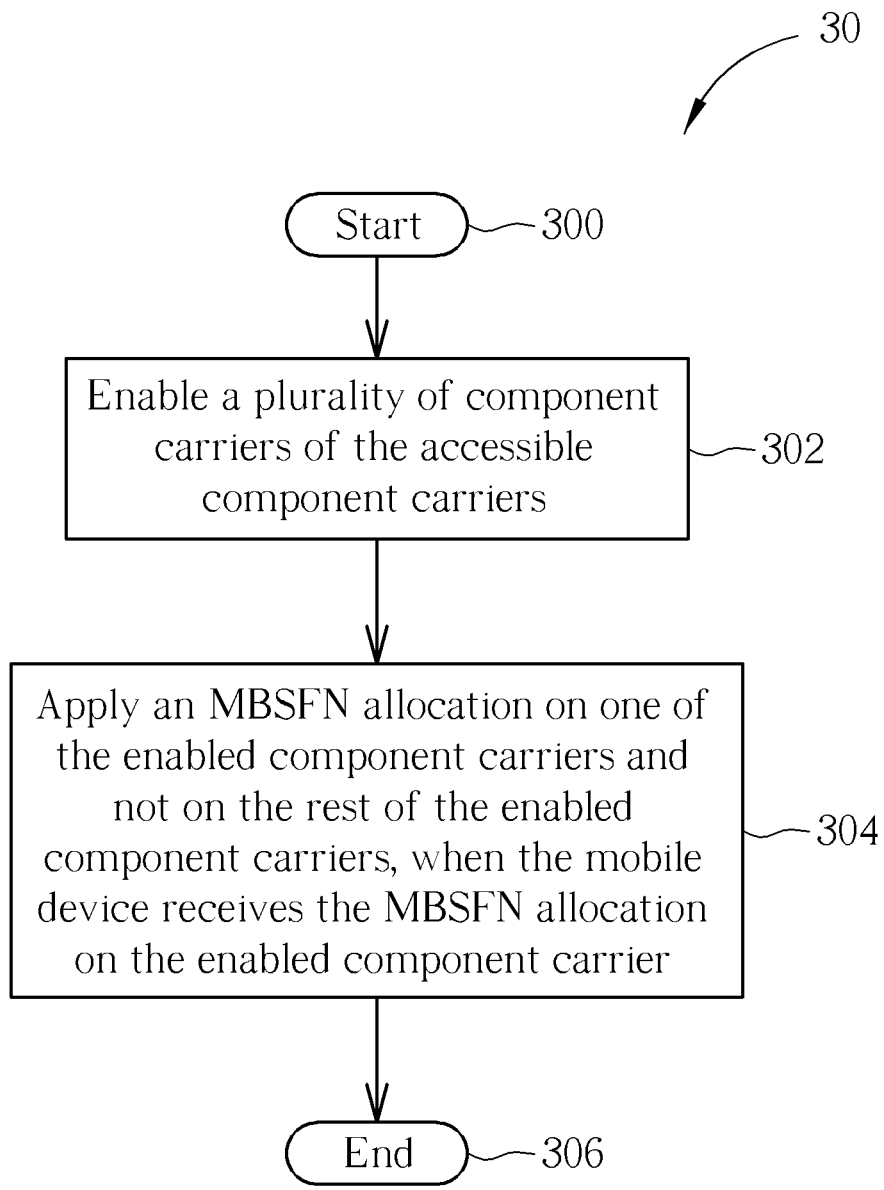
FIG. 3 is a flowchart of an examplary process.

Please refer to FIG. 3, which is a flowchart of an examplary process 30 that is provided for handling MBMS transmission/reception for a mobile device capable of simultaneously receiving data on maximum to m (m>1) component carriers in a wireless communications system (e.g. the mobile device 12 of FIG. 1). The process 30 may be compiled into the program code 214 and includes the following steps:

Step 300: Start.

Step 302: Enable a plurality of component carriers of the accessible component carriers.

Step 304: Apply an MBSFN allocation on one of the enabled component carriers and not on the rest of the enabled component carriers, when the mobile device receives the MBSFN allocation on the enabled component carrier.

Step 306: End.

According to the process 30, the UE enables more than component carriers that the network has configured for the UE to access (e.g. to transmit or receive data). When the mobile device receives a MBSFN allocation receives the MBSFN allocation on one of the enabled component carriers, the mobile device applies the MBSFN allocation only on the component carrier. This means that the mobile device may start to receive MBMS service via the component carrier applied with the MBSFN allocation. The rest of the enabled component carriers are not used for MBMS data reception if the mobile device does not receive their corresponding MBSFN allocations. In addition, the mobile device may determine that a subframe of one of the rest of the enabled component carriers (hereinafter called a second enabled component carrier) is not a MBSFN subframe when the mobile device is in a radio resource control connected (RRC_CONNECTED) mode, where a subframe time of the subframe corresponds to a subframe time configured as MBSFN subframe time. The mobile device may receive non-MBMS data (e.g. unicast data) via the second enabled component carrier that may be an extension carrier. The MBSFN allocation may be transferred by a system information block 2 (SIB2), including parameters of the number of subframe for the MBSFN transmission and related radio frame period and offset. A physical layer configuration of the mobile device may include maximum 8 MBSFN allocations. The MBSFN allocation for MBMS data may be further transmitted by another system information block.

Figure 4:
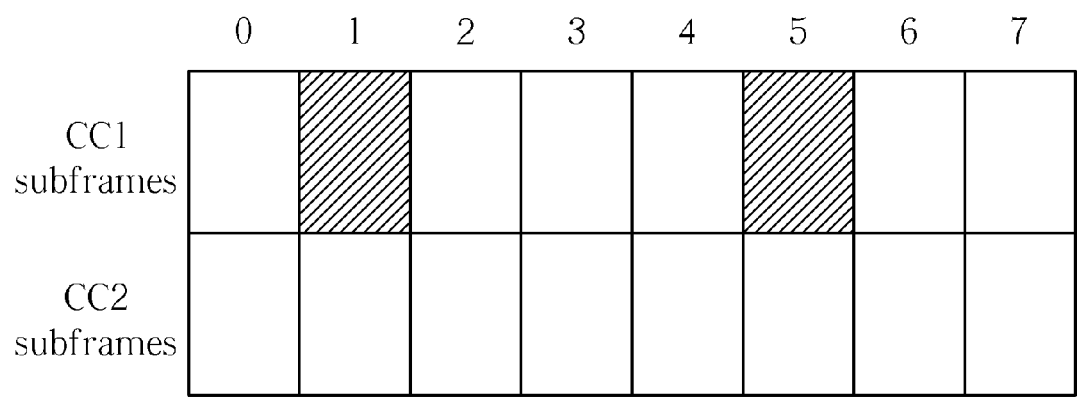
FIG. 4 is a schematic diagram of component carrier allocation according to FIG. 3.

Take an example illustrated in FIG. 4. The mobile device receives a MBSFN allocation configuration on a component carrier CC1 but does not receive a MBSFN allocation configuration on another component carrier CC2. Each radio frame of any component carrier of the mobile device includes 8 subframes. If the MBSFN allocation configuration indicates subframe numbers {1, 5}, the mobile device determines subframes {1, 5} of one or more radio subframes on the component carrier CC1 as MBSFN subframes. If the mobile device in a RRC_CONNECTED mode, the mobile device determines that subframes {1, 5} on the component carrier CC2 are not MBSFN subframes. The component carrier CC2 may be an extension carrier.

With the process 30, the mobile device can receive downlink data (e.g. unicast data) in subframes whose subframe times correspond to the MBSFN subframe times in an extension carrier when the network transmits data in the subframes. Thus, the data loss does not occur.

Figure 5:
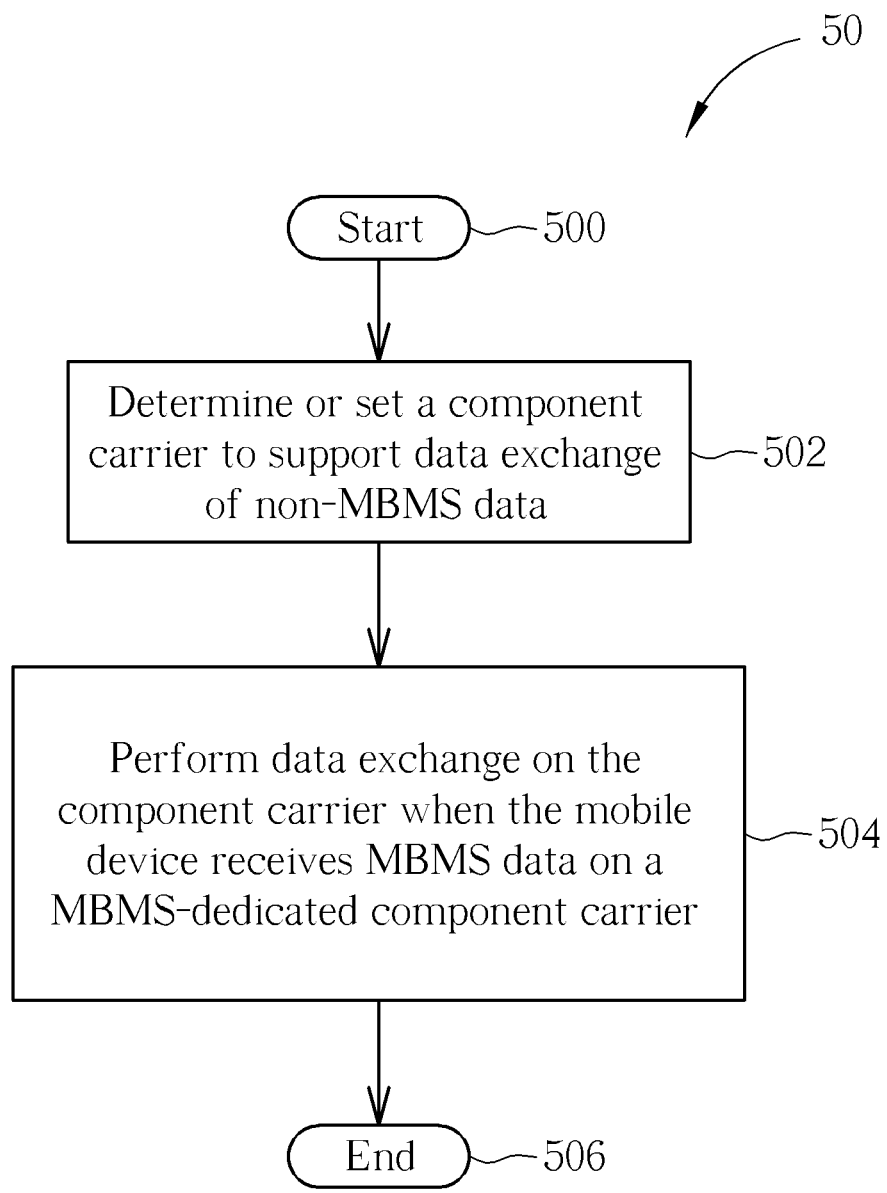
FIG. 5 is a flowchart of an examplary process.

Please refer to FIG. 5, which is a flowchart of an examplary process 50 that is provided for handling MBMS transmission/reception for a mobile device capable of simultaneously receiving data on maximum to m (m>1) component carriers in a wireless communications system (e.g. the mobile device 12 of FIG. 1). The process 50 may be compiled into the program code 214 and includes the following steps:

Step 500: Start.

Step 502: Determine or set a component carrier to support data exchange of non-MBMS data.

Step 504: Perform data exchange on the component carrier when the mobile device receives MBMS data on a MBMS-dedicated component carrier.

Step 506: End.

According to the process 50, the mobile device may determine/find that the component carrier supports the non-MBMS data exchange (e.g. unicast data exchange) or sets non-MBMS data exchange to be enabled in the component carrier according to network configuration. In this situation, the mobile device can perform the non-MBMS data exchange on the component carrier when also receiving the MBMS data on the MBMS dedicated component carrier. The MBMS dedicated component carrier is a component carrier used by a MBMS dedicated cell for MBMS transmission (e.g. a cell only for MBMS transmission, for neither a unicast transmission nor a broadcast transmission made not for a MBMS service). The component carrier may belong to a cell, whereas the MBMS dedicated component carrier may belong to another cell or a MBSFN area. In other words, the mobile device may receive the MBMS data on a MBMS dedicated component carrier and non-MBMS on a non MBMS dedicated component carrier at the same time. Neither MBMS data reception nor non-MBMS data transfer is interrupted due to establishment of MBMS/non-MBMS data transfer.

In addition, the mobile device may cell search/selection on the component carrier and may not stop or suspend receiving MBMS data on the MBMS dedicated component carrier during the cell search/selection. With the process 50, the mobile device can transmit or receive non-MBMS data without stopping or interrupting receiving MBMS data.

Figure 6:
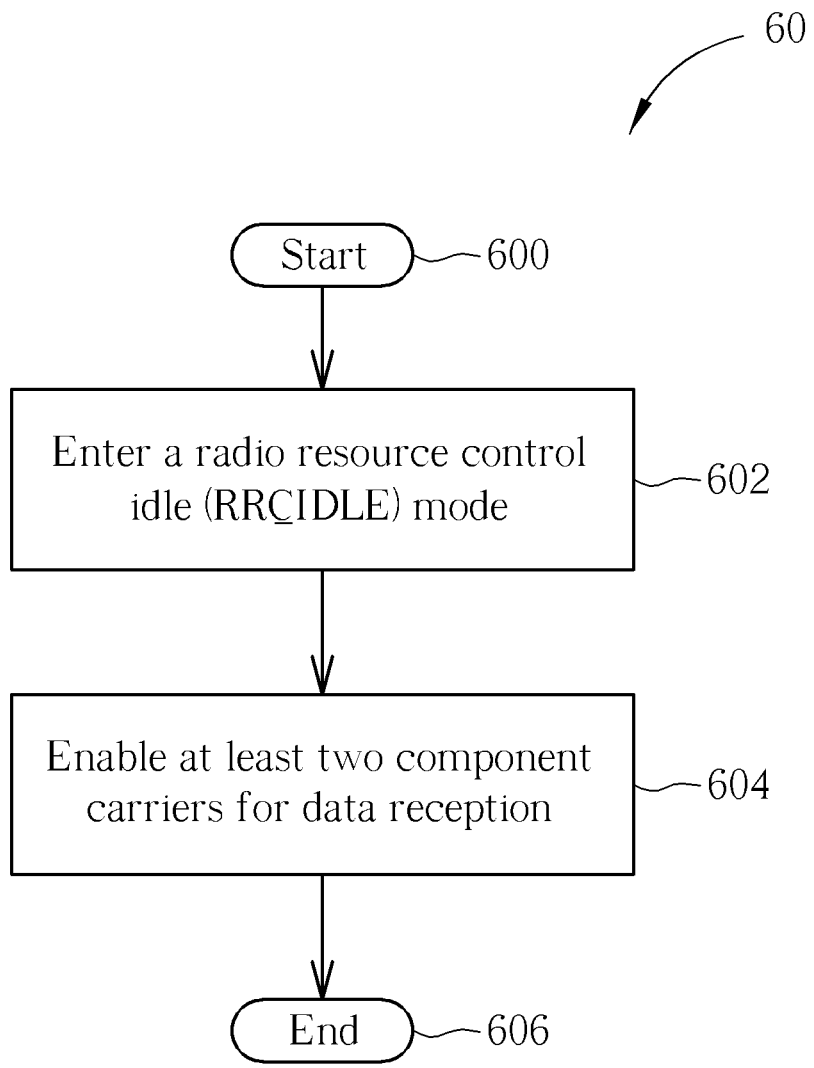
FIG. 6 is a flowchart of an examplary process.

Please refer to FIG. 6, which is a flowchart of an examplary process 60 that is provided for handling MBMS transmission/reception for a mobile device capable of simultaneously receiving data on maximum to m (m>1) component carriers in a wireless communications system (e.g. the mobile device 12 of FIG. 1). The process 60 may be compiled into the program code 214 and includes the following steps:

Step 600: Start.

Step 602: Enter a radio resource control idle (RRC_IDLE) mode.

Step 604: Enable at least two component carriers for data reception.

Step 606: End.

According to the process 60, the mobile device enables at least two component carriers for non MBMS data/MBMS data reception when being in the RRC_IDLE mode. The mobile device may only use one antenna to receive signals on the component carriers. The enabled component carriers may belong to different cells. For example, the mobile device may simultaneously camp on a cell via a first component carrier providing non MBMS data transmission/reception and receive MBMS data via a MBMS dedicated component carrier. In other words, the mobile device can separately maintain system information and manage cell selection or reselection in cells with different component carriers. Thus, the mobile device is allowed to use more than one component carrier in the RRC_IDLE mode.

Furthermore, the mobile device may transmit data (e.g. unicast data) on the first component carrier if operating with time-division duplex (TDD) and may transmit data on an uplink component carrier associated to the first component carrier if operating with frequency-division duplex (FDD).

Figure 7:
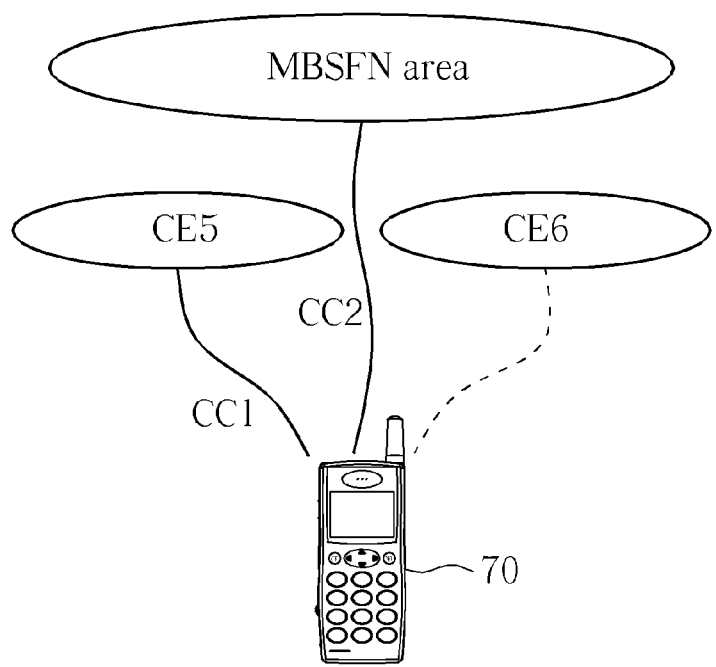
FIGS. 7-10 are schematic diagrams of cell reselections according to FIG. 6.
Figure 8:
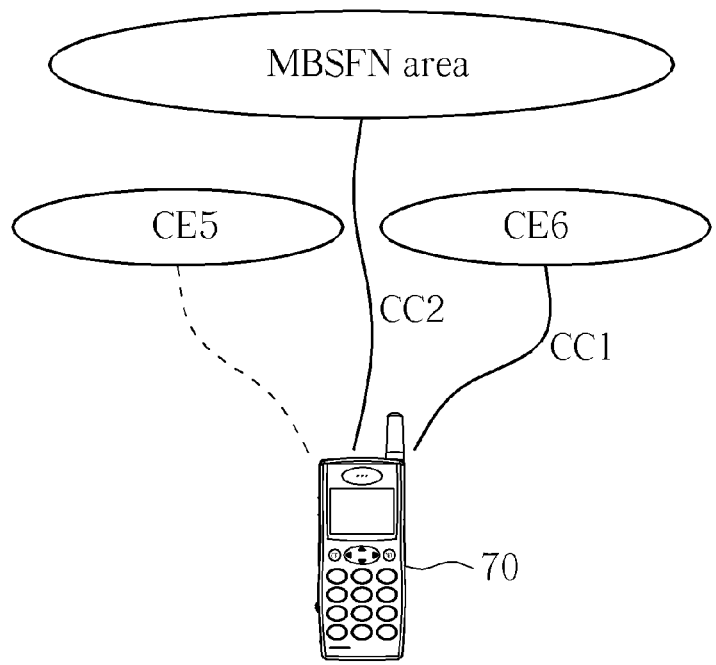

In addition, the mobile device may measure a non MBMS component carrier for cell reselection. The mobile device may reselect a cell, without stopping any on-going MBMS data reception of a MBMS dedicated component carrier, when the mobile device finds that the cell provides better signal quality in a non-MBMS service than a serving cell of the mobile device does. Take an example illustrated in FIG. 7, where a mobile device 70 in the RRC_IDLE mode camps on a cell CE5 with a component carrier CC1 for non MBMS data transmission/reception and receives MBMS data on a MBMS dedicated component carrier CC2 in an MBSFN Area. The cell CE5 may be a serving cell of the mobile device 70. The mobile device 70 measures a cell CE6 with the component carrier CC1 and finds the cell CE6 provides better communications environment than the cell CE5 based on cell reselection criteria that is calculation of signal strength and offset and may be performed according to a 3GPP specification document: 3GPP TS 36.304 "User Equipment (UE) procedures in idle mode". In this situation, the mobile device 70 reselects to the cell CE6 with the component carrier CC1 and keeps receiving MBMS data on the MBMS dedicated component carrier CC2 without interruption, as shown in FIG. 8.

Figure 9:
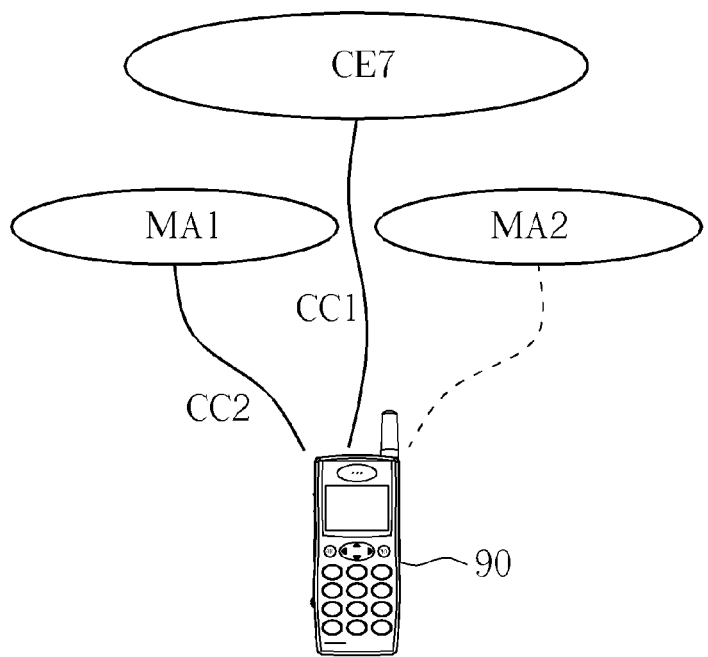
Figure 10:
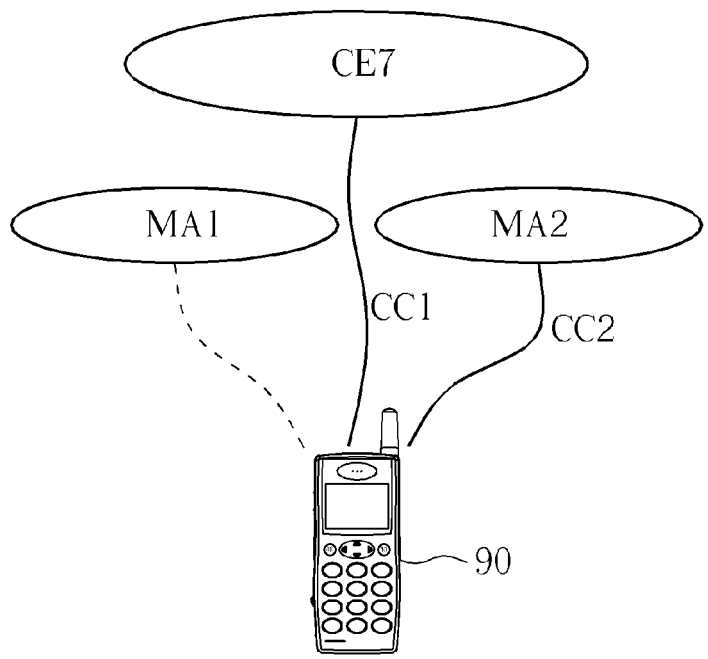

Take another example illustrated in FIG. 9, where a mobile device 90 in the RRC_IDLE mode camps on a cell CE7 with a component carrier CC1 for non MBMS data transmission/reception and receives MBMS data on a MBMS dedicated component carrier CC2 from a serving MBMS dedicated cell of an MBSFN area MA1. The mobile device 90 measures the MBMS dedicated component carrier CC2 for MBMS dedicated cell reselection. If the mobile device 90 finds a new MBMS dedicated cell in an MBSFN area MA2 is better than the serving MBMS dedicated cell, the UE reselects to the MBMS dedicated cell, as shown in FIG. 10. Preferably, the selected MBMS dedicated cell belongs to a different MBSFN Area from the serving MBMS dedicated cell.

Figure 11:
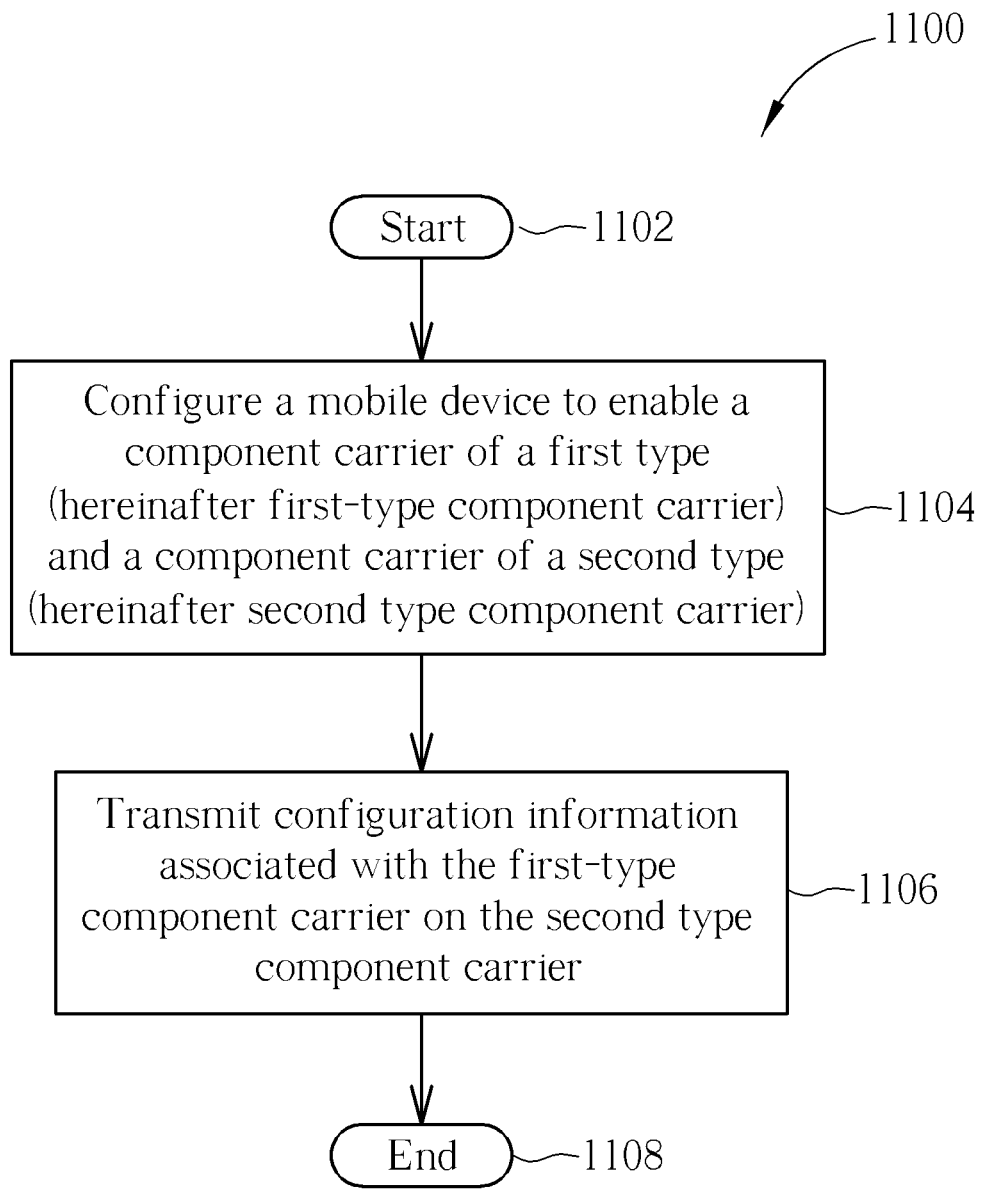
FIG. 11 is a flowchart of an examplary process.

Please refer to FIG. 11, which is a flowchart of an exemplary process 1100 that is provided for handling MBMS transmission/reception for a network in a wireless communications system. The process 1100 may be compiled into the program code 214 and includes the following steps:

Step 1102: Start.

Step 1104: Configure a mobile device to enable a component carrier of a first type (hereinafter first-type component carrier) and a component carrier of a second type (hereinafter second-type component carrier).

Step 1106: Transmit configuration information associated with the first-type component carrier on the second-type component carrier.

Step 1108: End.

According to the process 1100, the network (e.g. a cell, an eNB, a base station or an E-UTRAN) configures the mobile device to enable the first-type component carrier and the second type component carrier for carrier aggregation. In other words, the mobile device can simultaneously communicate with the network with the first-type and second-type component carriers. After this, the network may transmit configuration information associated with the first-type component carrier on the second-type component carrier. Therefore, the example allows the configuration information associated with component carrier of one type to be sent on a component carrier of another type, thereby increasing configuration allocation flexibility.

For example, the network may transmit configuration information associated with a MBMS dedicated component carrier on a non MBMS dedicated component carrier or on another MBMS dedicated component carrier. The configuration information may be transmitted to the mobile device via RRC message(s). Accordingly, the mobile device may receive the RRC message(s) on the non MBMS dedicated component carrier and also receive MBMS data on the MBMS dedicated component carrier, according to the configuration information. The RRC message(s) may be broadcast RRC message(s) or RRC message dedicated to the mobile device. The configuration information may include frequency information of the MBMS dedicated component carrier for being configured, so that the mobile device can turn its radio frequency (RF) receiver to the frequency indicated by the configuration information to receive MBMS services. The configuration information may further include MBSFN allocations, MBMS Control Channel (MCCH) information, MBMS Traffic Channel (MTCH) information or dynamic scheduling information.

As can be seen from the above, the MBMS dedicated component carrier for being configured is associated to a non MBMS dedicated component carrier or to another MBMS dedicated component carrier. If the MBMS dedicated component carrier is associated to another MBMS dedicated component carrier, the MBMS dedicated component carrier can be an extension carrier.

Take another example, the network may transmit configuration information associated with a non MBMS dedicated component carrier via RRC message (s) on a MBMS dedicated component carrier. Accordingly, the mobile device may receive the RRC message (s) on the MBMS dedicated component carrier, and transmit non MBMS data (e.g. unicast data) on the non MBMS dedicated component carrier if the mobile device needs to transmit the non MBMS data. The RRC message(s) may be broadcast RRC message(s) or RRC message dedicated to the mobile device. The configuration information may include frequency information of the non MBMS dedicated component carrier so that the mobile device can turn its RF transmitter or its receiver to the frequency of the non MBMS dedicated component carrier and transmit/receive the non MBMS data. The mobile device may perform a random access procedure to transmit the non MBMS data when being in the RRC_IDLE mode.

Figure 12:
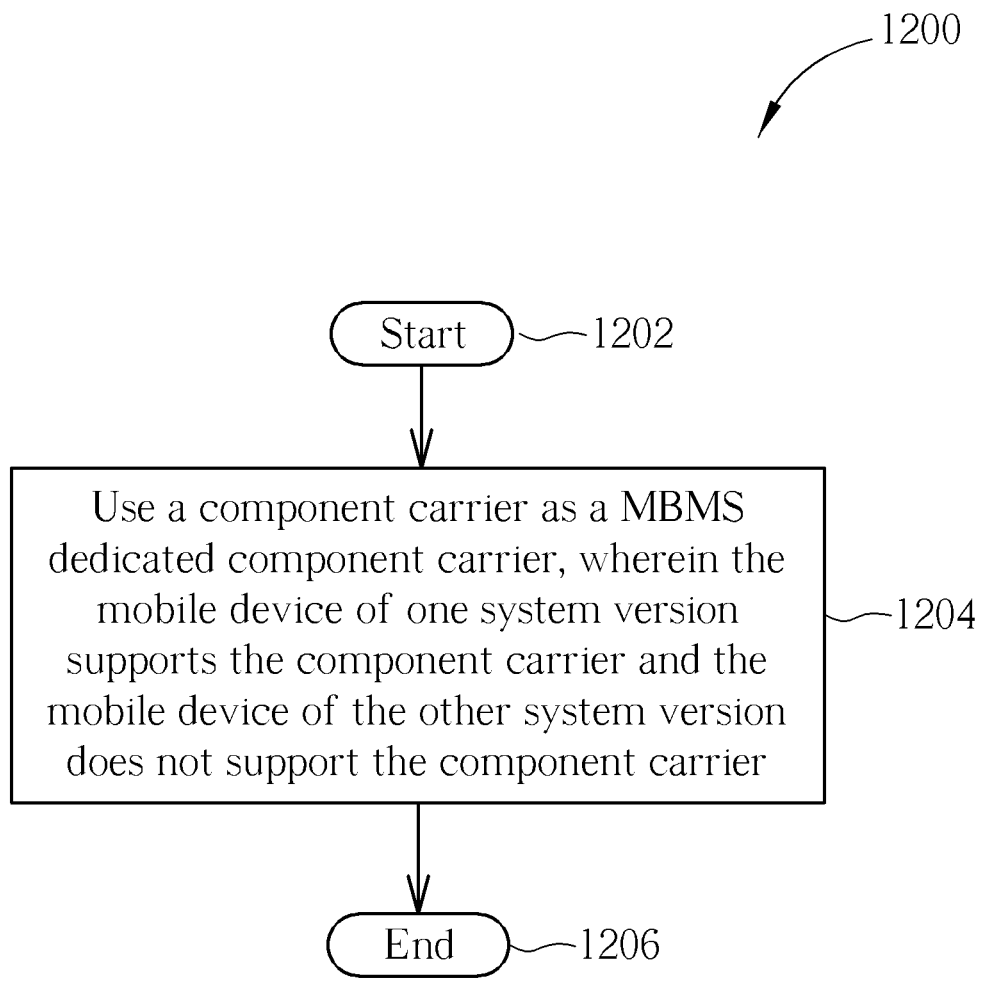
FIG. 12 is a flowchart of an examplary process.

Please refer to FIG. 12, which is a flowchart of an exemplary process 1200 that is provided for handling MBMS transmission/reception for a network supporting communication with mobile devices of two types of system versions. The mobile devices of the types of system version use totally or partially different component carrier frequency bands. The process 1200 may be compiled into the program code 214 and includes the following steps:

Step 1202: Start.

Step 1204: Use a component carrier as a MBMS dedicated component carrier, wherein the mobile device of one system version supports the component carrier and the mobile device of the other system version does not support the component carrier.

Step 1206: End.

According to the process 1200, the network (e.g. a cell, an eNB, a base station or an E-UTRAN) uses the abovementioned component carrier as a MBMS dedicated component carrier. Thus, the mobile device whose other system version does not support the component carrier does not select a cell only providing data transfer of the component carrier to camp on.

Take LTE/LTE-A system for example. A release 8 UE or a release 9 UE (LTE UE) is considered legacy UEs. When a cell is deployed for only providing MBMS data transfer on the MBMS dedicated component carrier and selected by the release 8/9 UE, it is not possible for the release 8/9 UE to have access for non MBMS data. Through the process 1200, the network uses a component carrier that the release 8/9 UE does not support as a MBMS dedicated component carrier. Thus, when a cell is deployed for only providing MBMS data transfer on the MBMS dedicated component carrier, this cell can only be selected by the release 10 UE (compatible UE) during cell selection/reselection, not by the release 8/9 UE. Therefore the release 8/9 UE is not stuck to the cell and can find a cell supporting access for non MBMS data.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the examples provide ways for the mobile device (UE) to apply MBSFN allocation when multiple carriers (carrier aggregation) are enabled to avoid data loss. In addition, the examples also provide ways for the mobile device (UE) to MBMS/unicast transmission when the MBMS and unicast transmissions are both activated. Furthermore, the examples provide ways for the network to allocate MBMS service resource under consideration of the co-existed mobile devices of different system versions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling multimedia broadcast and multicast service (MBMS) reception for a mobile device capable of simultaneously receiving data on a plurality of component carriers in a long term evolution-advanced wireless communication system, the method comprising:

enabling the plurality of component carriers;

applying a multi-media broadcast over a single frequency network (MBSFN) allocation on a first enabled component carrier and not on rest of the plurality of enabled component carriers, when the mobile device receives the MBSFN allocation on the first enabled component carrier; and receiving data in a subframe of a second enabled component carrier, wherein the subframe is not a MBSFN subframe used for reception of MBMS data when the mobile device is in a radio resource control connected mode and a subframe time of the subframe corresponds to a MBSFN subframe time.

2. The method of claim 1 further comprising:

determining that the subframe of the second enabled component carrier is not the MBSFN subframe used for the reception of MBMS data when the mobile device is in the radio resource control connected mode.

3. The method of claim 1 further comprising:

receiving non-MBMS data via the second enabled component carrier.

4. The method of claim 3, wherein the second enabled component carrier is an extension carrier.

5. A communication device capable of simultaneously receiving data on a plurality of component carriers of a long term evolution-advanced wireless communication system for handling multimedia broadcast and multicast service (MBMS) reception, the communication device comprising:

a process means for executing a program code; and a memory unit coupled to the process means for storing a program; wherein the program code instructs the process means to perform the following steps: enabling the plurality of component carriers;

applying a multi-media broadcast over a single frequency network (MBSFN) allocation on a first enabled component carrier and not on rest of the plurality of enabled component carriers, when the mobile device receives the MBSFN allocation on the first enabled component carrier; and receiving data in a subframe of a second enabled component carrier, wherein the subframe is not a MBSFN subframe used for reception of MBMS data when the mobile device is in a radio resource control connected mode and a subframe time of the subframe corresponds to a MBSFN subframe time.

6. The communication device of claim 5, wherein the program code further instructs the process means to perform the following step:

determining that the subframe of the second enabled component carrier is not the MBSFN subframe used for the reception of MBMS data when the mobile device is in the radio resource control connected mode.

7. The communication device of claim 5, wherein the program code further instructs the process means to perform the following step: receiving non-MBMS data via the second enabled component carrier.

8. The communication device of claim 7, wherein the second enabled component carrier is an extension carrier.

* * * * *